US008863079B2

(12) United States Patent
Darcy et al.

(10) Patent No.: US 8,863,079 B2
(45) Date of Patent: Oct. 14, 2014

(54) EFFICIENT AND EXPANSIVE CONVERSIONS BETWEEN REFERENCE AND PRIMITIVE

(75) Inventors: Joseph D. Darcy, Redwood City, CA (US); Maurizio Cimadamore, Dublin (IE); Alexander R. Buckley, Cupertino, CA (US)

(73) Assignee: Oracle International Corporation, Redwood City, CA (US)

( * ) Notice: Subject to any disclaimer, the term of this patent is extended or adjusted under 35 U.S.C. 154(b) by 102 days.

(21) Appl. No.: 13/563,587

(22) Filed: Jul. 31, 2012

(65) Prior Publication Data

US 2014/0040860 A1    Feb. 6, 2014

(51) Int. Cl.
*G06F 9/44*    (2006.01)
*G06F 9/45*    (2006.01)

(52) U.S. Cl.
USPC ............ 717/108; 717/116; 717/121; 717/159

(58) Field of Classification Search
None
See application file for complete search history.

(56) References Cited

U.S. PATENT DOCUMENTS

| | | | |
|---|---|---|---|
| 5,583,988 A | 12/1996 | Crank et al. | |
| 5,815,415 A | 9/1998 | Bentley et al. | |
| 5,987,242 A | 11/1999 | Bentley et al. | |
| 6,063,128 A | 5/2000 | Bentley et al. | |
| 6,138,269 A | 10/2000 | Ball et al. | |
| 7,093,263 B1 * | 8/2006 | Sexton et al. | 719/316 |
| 7,269,718 B2 * | 9/2007 | Alexander et al. | 712/221 |
| 7,823,130 B2 * | 10/2010 | Moser et al. | 717/124 |
| 8,079,023 B2 | 12/2011 | Chen | |
| 8,375,373 B2 * | 2/2013 | Sollich | 717/146 |
| 2003/0093778 A1 * | 5/2003 | Bak et al. | 717/140 |
| 2005/0149914 A1 * | 7/2005 | Krapf et al. | 717/136 |
| 2006/0225053 A1 * | 10/2006 | Lakshman et al. | 717/140 |
| 2009/0172653 A1 | 7/2009 | Elliott | |
| 2011/0099533 A1 * | 4/2011 | Clinton | 717/108 |
| 2011/0265066 A1 * | 10/2011 | Fee et al. | 717/139 |
| 2011/0320456 A1 * | 12/2011 | Harischandrakar et al. | 707/740 |
| 2013/0081004 A1 * | 3/2013 | Vargas | 717/137 |

OTHER PUBLICATIONS

Diego Calvanes, "Lecture Notes for Introducting to Programming", A.A. Jul. 2006, pp. 1-20.*
Oracle, "Chapter 5. Conversions and Promotions," downloaded from docs.oracle.com/javase/specs/jls/se7/html/jls-5.html on Jun. 14, 2012, pp. 1-25.

* cited by examiner

*Primary Examiner* — Isaac T Tecklu
(74) *Attorney, Agent, or Firm* — Robert C. Kowert; Meyertons, Hood, Kivlin, Kowert & Goetzel, P.C.

(57) ABSTRACT

A tool, such as a compiler or an interpreter, receives program source code and determines that the code includes an operation for which type conversion is permitted on an operand. The tool determines a source type of the operand, and a target type to which the operand is to be converted. In response to determining that the source type is a reference type and the target type is a primitive type, the tool generates a set of instructions to (a) determine whether, at run time, in accordance with a class definition of the reference type, a value of the target primitive type can be obtained via one or more method invocations on the operand (b) if such a value can be obtained, obtain the value and assign the value to a result of the operation and (c) if such a value cannot be obtained, generate an error indication.

20 Claims, 9 Drawing Sheets

| Type | Size (bytes) | Range |
|---|---|---|
| boolean | 1 bit | true or false |
| byte | 1 | -128 to 127 |
| short | 2 | -32768 to 32767 |
| int | 4 | -2147483648 to 2147483647 |
| long | 8 | -9223372036854775808 to 9223372036854775807 |
| float | 4 | Approx. +/-$10^{-38}$ to +/-$10^{38}$, 7 significant digits |
| double | 8 | Approx. +/-$10^{-308}$ to +/-$10^{308}$, 15 significant digits |
| char | 2 | Unicode UTF-16 code unit |

To (primitive Target)

| | byte | short | char | int | long | float | double |
|---|---|---|---|---|---|---|---|
| Byte | u | u,w | WW,NN | u,w | u,w | u,w | u,w |
| Short | NN | u | NN | u,w | u,w | u,w | u,w |
| Character | NN | NN | u | u,w | u,w | u,w | u,w |
| Integer | NN | NN | NN | u | u,w | u,w | u,w |
| Long | NN | NN | NN | NN | u | u,w | u,w |
| Float | NN | NN | NN | NN | NN | u | u,w |
| Double | NN | NN | NN | NN | NN | NN | u |
| Object | r,u *or* NN *or* WW,NN *or* ClassCastException ||||||||

From (reference Source)

Legend:
r = narrowing reference-to-reference
u = unboxing
w = widening primitive-to-primitive
NN = narrowing reference-to-primitive
WW = widening reference-to-primitive

*Figure 5*

To (reference Target)

| | Byte | Short | Character | Integer | Long | Float | Double | Object |
|---|---|---|---|---|---|---|---|---|
| byte | b | ww | ww | ww | ww | ww | ww | b,R |
| short | nn | b | ww | ww | ww | ww | ww | b,R |
| char | nn | nn | b | ww | ww | ww | ww | b,R |
| int | nn | nn | nn | b | ww | ww | ww | b,R |
| long | nn | nn | nn | nn | b | ww | ww | b,R |
| float | nn | nn | nn | nn | nn | b | ww | b,R |
| double | nn | nn | nn | nn | nn | nn | b | b,R |

From (primitive Source)

Legend:
b = boxing
nn = narrowing primitive-to-reference
ww = widening primitive-to-reference
R = widening reference-to-reference

*Figure 6*

EFFICIENT AND EXPANSIVE CONVERSIONS BETWEEN REFERENCE AND PRIMITIVE

BACKGROUND

For performance and other reasons, object-oriented computer programming languages, such as Java™, may support a set of primitive data types in addition to reference data types. In general, a variable's data type determines the values it may contain, and the operations that may be performed on it. The terms "primitive types" and "reference types" may be used herein to refer to "primitive data types" and "reference data types" respectively. Primitive types may be predefined by the language specification, and may be named using reserved keywords (such as int or float). In some environments, the value of a primitive type may be stored in a location of a fixed size on the stack, such as a four-byte (32-bit) location for int variables, and may not share state with other primitive values. In contrast, a data type for which, when an object of that data type is instantiated, a reference (in effect, a pointer) to a heap location storing the value of the instantiated object is created, is called a reference type. In other environments, the stack-versus-heap distinction between primitive and reference types may not always apply. For example, virtual machines with escape analysis optimization may be able to stack-allocate certain objects of reference types. In general, a small number of primitive types may be supported by the language, while arbitrary numbers of reference types (e.g., classes, interfaces, or arrays, in the case of Java™) may be defined and created by users of the language. It is noted that the distinction between primitive and reference types may be affected somewhat by language features like value types, which may allow user-defined types to behave more like primitives than reference types. For example, objects of values types would not be comparable for identity, only for value.

Some language constructs or frameworks (such as various classes defined in the Java™ Collections framework for representing aggregates like sets, lists, and maps) may be provided strictly for reference types in object-oriented languages. That is, it may not be legal in the language to set up an aggregate of primitive values, or use aggregate features such as iterators directly on primitive values. However, a number of special reference types, called wrapper types, may also be supported in some languages to manually or automatically encapsulate primitive values as objects (e.g., an int value may be encapsulated using the Integer wrapper reference type in Java™, effectively converting a primitive value to a reference to an object with the same numerical value), so that the functionality provided by the frameworks may be extended to primitive values which are suitably wrapped.

The object-oriented programming language may support implicit and explicit data type conversion operations, in which, for example, the value of an expression of a source data type S may be stored in a variable of a target data type T. The following code may represent an example explicit casting conversion operation:

```
1. // someMethod returns an object of type SourceType
2. SourceType s = someClass.someMethod( );
3. // explicit cast to convert s to type TargetType
4. TargetType t = (TargetType) s;
```

Several different kinds of type conversion operations may be supported in a given programming language. For example, exhaustive primitive-to-primitive conversions may be supported for numerical primitives, such as a conversion of an int to a short, or a short to an int. However, in many cases, there may be limitations and irregularities in the extent to which conversions from primitive types to reference types (or from reference types to primitive types) are supported in a given version of a programming language. For example, even though it may appear to a programmer that it would be reasonable and meaningful to be able to convert from a reference type R to a primitive type P (e.g., Long to int), on the grounds that it is meaningful to convert from the unwrapped form of R to P (i.e. long to int), the language may not permit such a transformation (i.e., a compile-time error or a run-time error may be thrown).

SUMMARY

A system and method is disclosed for efficient and expansive conversions between primitive and reference types. A tool capable of generating executable instructions (such as a compiler or an interpreter) for a programming language that supports primitive data types and reference data types is configured to receive source code for a program. For an operation included in the source code for which type conversion is permitted for at least one operand, the tool determines a source type of the operand, and a target type to which the operand is to be converted. In response to determining that the source type is a reference type and the target type is a primitive type, the tool generates a set of instructions to (a) determine, at run time, in accordance with a class definition of the reference type, whether a value of the target primitive type can be obtained via one or more method invocations on the operand (b) if such a value can be obtained, obtain the value and assign the value to the result of the operation and (c) if such a value cannot be obtained, generate an error indication. In embodiments where the tool comprises a compiler, the generated instructions are stored in an executable version of the program; in embodiments where an interpreter is used, the instructions may be executed upon generation, without being stored in a persistent executable version of the program. In some embodiments, to determine whether the value of the target primitive value can be obtained, the tool may generate instructions to determine whether the run-time class of the operand is a wrapper class designed to encapsulate a primitive value.

In one embodiment, if the tool determines that the source type is a primitive type and the target type is a reference type, the compiler may generate a set of instructions to (a) obtain at run time, using the operand as a parameter, an object of a wrapper class corresponding to the primitive type; (b) perform a numeric conversion operation supported by the wrapper class to obtain an intermediate primitive value of a different primitive type encapsulated by the target type; and (c) perform a boxing operation to obtain an object of the target type from the intermediate primitive value.

According to some embodiments, if the tool determines that the source type is a reference type and the target type is also a reference type, the tool may generate a set of instructions to implement a sequence of operations to obtain an object of the target type from the operand, wherein the sequence comprises one or more of: a reference-to-primitive conversion, an unboxing operation, a primitive-to-reference conversion, a boxing operation, or a numeric value extraction operation.

BRIEF DESCRIPTION OF THE DRAWINGS

FIG. 5 illustrates examples of reference-to-primitive conversion operations that may be supported by a compiler or an interpreter, according to some embodiments.

FIG. 6 illustrates examples of primitive-to-reference conversion operations that may be supported by a compiler or an interpreter, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

It is noted that, while much of the following description refers to the use of a compiler for various type conversion operations, similar operations may be performed in some embodiments by a different tool, such as an interpreter. For example, an interpreter may consume source code as input (just as a compiler does) and generate executable instructions implementing similar logic as described below with respect to a compiler. In cases where an interpreter is being used, the generated instructions may be executed forthwith, and may not be stored in a persistent form (e.g., as an executable version of the source program) as they typically would be if a compiler were used. The kinds of errors thrown when conditions such as an attempt to perform an unsupported conversion are encountered, and the error messages provided, may differ in some cases between the compiler and the interpreter. In various embodiments, the kinds of type conversions described below may be considered as functions on (a) the static type of a source expression, (b) the static type of a target variable, and (c) the dynamic type of the source expression. In embodiments where a compiler is used, the term "static" may be translated as "known at compile-time"; however, in embodiments where a different tool is being used, the term "static" can be generalized to mean "known prior to execution". The involvement of a dynamic type implies that conversion can only be effected by a tool emitting operations that are to be performed at runtime. An interpreter (e.g., for Java™ source code) may actually have an advantage over a compiler in some cases, since it not only knows the "static" source and target types, but also the dynamic type of the source expression. Such an interpreter may perform at runtime the same operations to effect conversion which a compiler would have emitted.

Figure 1:
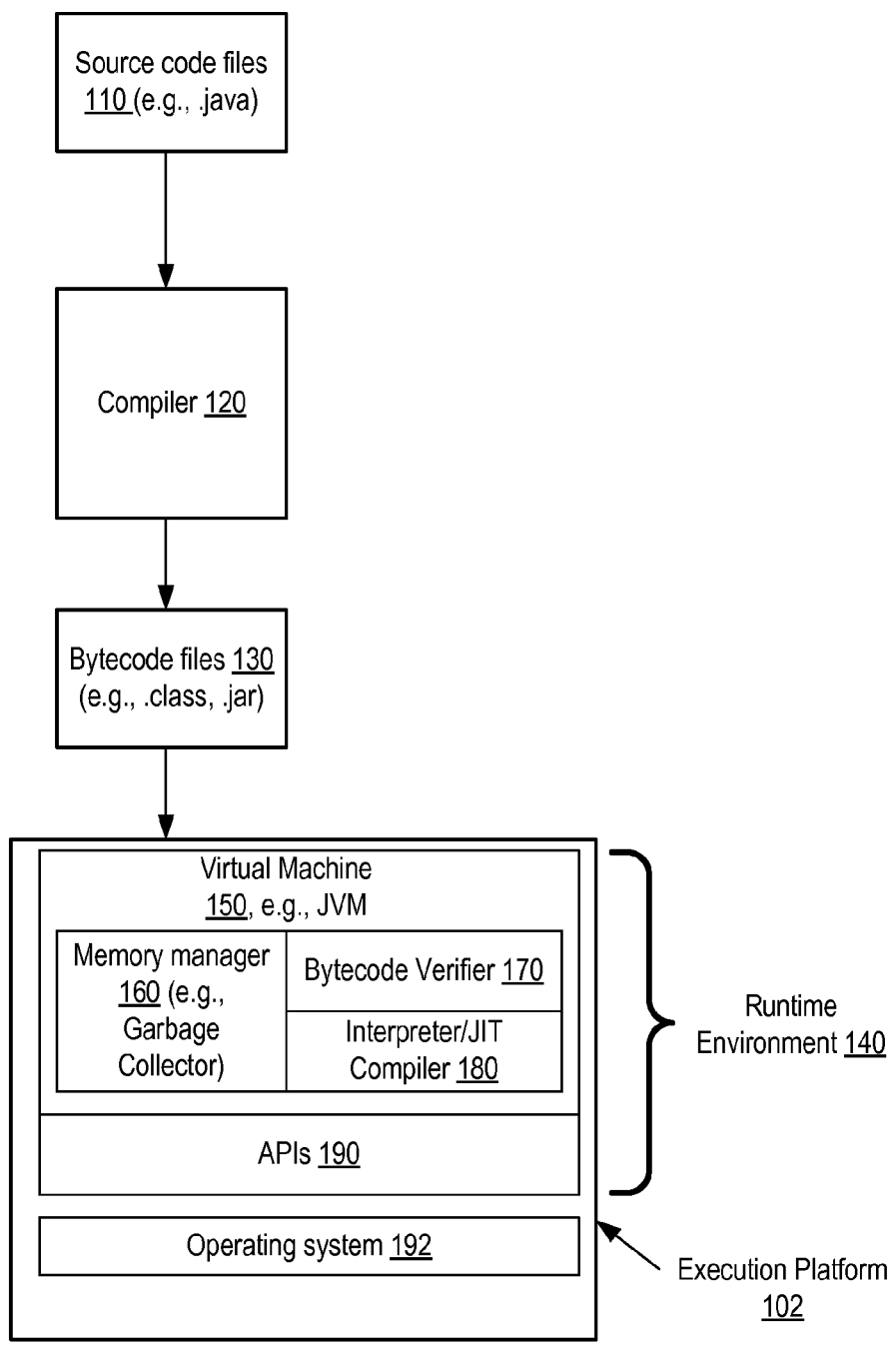
FIG. 1 illustrates a workflow for compiling and executing a computer program specified in a high-level object-oriented language, according to various embodiments.

FIG. 1 illustrates a workflow for compiling and executing a computer program specified in a high-level object-oriented language that supports primitive and reference data types, and type conversion operations between different data types, according to various embodiments. Type conversions may occur in several contexts in source code written using the object-oriented language—e.g., (a) in the context of cast operations such as "TargetObject targetObject=(TargetObject) sourceObject;" (b) in the context of assignment operations of the form "leftHandSide=rightHandSideExpression;" in which at least one term in the right hand side expression is of a different data type than the data type of the left hand side of the assignment or (c) in the context of method calls such as "result=someObject.someMethod(a,b,c);" in which at least one of the actual parameters (a, b, or c) is of a different data type than the data type of the corresponding formal parameter of the method. For purposes of illustration, the following description is provided largely in the context of cast operations using the Java™ programming language; however, it is noted that the techniques described may be used for any programming language that supports primitive and reference types and data type conversions in any appropriate context.

According to the illustrated embodiment, the workflow begins when a compiler implementing type conversion functionality, such as compiler 120, receives source code for a computer program, such as files 110. In various embodiments, source code 110 may be specified in various high-level and/or object-oriented programming languages, such as Java™ and/or other languages. Source code may be provided as a set of .java files in embodiments where Java™ is being used. In some embodiments, source code 110 may be specified using a combination of languages, which may include one or more low-level and/or intermediate languages (e.g., assembly). In some embodiments, at least some of the source code may initially be written in a dynamically-typed high-level language, such as Python or Ruby, while in other embodiments, all of the source code may be in a statically-typed language such as Java™.

The compiler 120 may analyze the source code 110 to produce an executable version of the program, such as bytecode files 130 (e.g., .class files or .jar files in the case of Java™) in the depicted embodiment. Different types of executable code formats may be used in various embodiments; for example, binary machine language may be used instead of bytecodes. In some scenarios, parts of the executable code 130 may be in bytecode while others are in a native binary machine language. As part of compiling program source code 110 into executable code 130, the compiler 120 may perform a sequence of analysis operations and generate various intermediate data structures before generating the executable version, as described below in further detail with reference to FIG. 2. The compiler 120 may, for example, identify various data type conversion operations such as cast operations, determine the source and target types of the conversions, and decide, based on the static source and target types that can be determined at compile-time, whether a compile-time error should be generated. If a given conversion operation is determined to be acceptable for compilation, appropriate code may be generated for it. Depending on the run-time behavior of the program (i.e., exactly which objects of which types are instantiated during execution), even if a conversion is successfully compiled, a run-time exception may still be generated in some cases, as described below in further detail.

As illustrated in FIG. 1, executable code 130 may be passed to an execution environment, such as run-time environment 140, which executes the code on an execution platform 102, thereby creating various output data and/or behavior. In various embodiments, the run-time environment 140 may include a virtual machine 150 (e.g., a Java™ Virtual Machine or JVM). The virtual machine 150 may in turn comprise a number of different components, such as a memory manager 160 (which may include a garbage collector), a bytecode verifier 170 to check the validity of the executable code, an interpreter and/or a just-in-time (JIT) compiler 180 such as the HotSpot compiler. The JIT compiler may in some embodiments be responsible for translating some or all of the bytecode (for example, heavily-used portions of bytecode) into platform-specific machine code to improve performance of the program execution. A run-time environment 140, such as the Java™ Runtime Environment or JRE, may also include code to implement a number of application programming interface (API) libraries 190 in some embodiments. The run-time environment 140 may run on top of lower-level software such as an operating system 192 in some embodiments. In embodiments where virtualized compute resources are being used as the execution platform, virtualization software such as a hypervisor may be used to configure the execution platform 102 for the operating system 192 (i.e., the operating system may run as an application on top of the hypervisor).

In different embodiments, the output or behavior produced as a result of the execution of the compiled code may include data stored in various levels of system memory (e.g., in-memory objects and/or data structures), on persistent storage (e.g., files on a file system), etc. The behavior may also include various program functionalities, such as displaying output on a screen, sending messages over a network, and/or otherwise interacting with various users and/or components.

Figure 2:
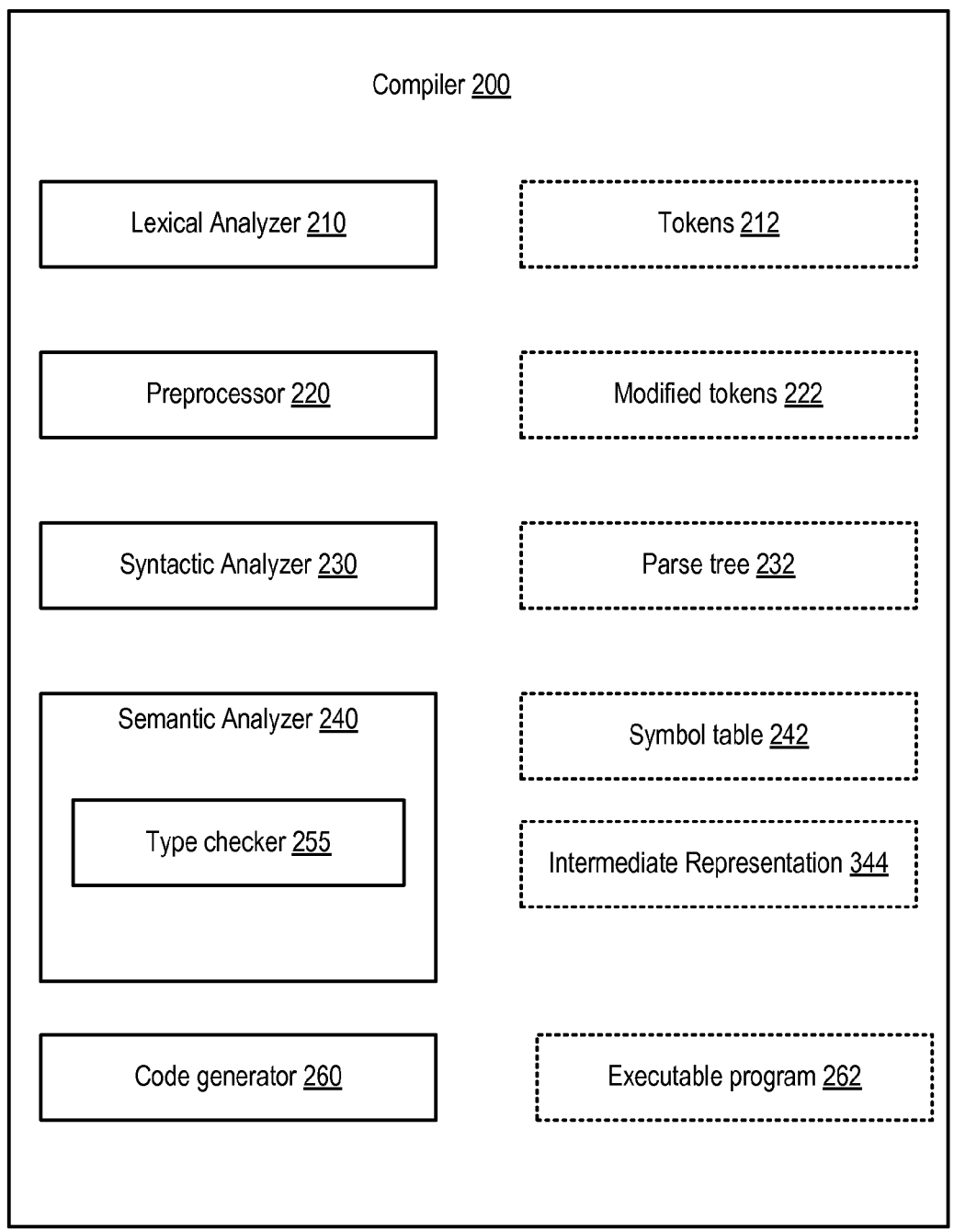
FIG. 2 is a block diagram illustrating the components of a compiler configured to support conversion operations between reference and primitive types, according to at least some embodiments.

FIG. 2 is a block diagram illustrating the components of a compiler configured to support various types of conversion operations between reference and primitive types, according to at least some embodiments. The compiler may be implemented in software and executed by a computer system on given source code, such as source code 110 of FIG. 1. In FIG. 2, solid outlines indicate functional components, while dashed lines indicate data structures passed among the functional components.

According to the illustrated embodiment, compiler 200 may include lexical analyzer 210, which may be configured to break the input source code into tokens, such as tokens 212. Each token 212 may correspond to a single atomic unit of the given language, such as keywords, identifiers, etc. In various embodiments, the token syntax may be represented as a regular language. Compiler 200 may include preprocessor 220 in the depicted embodiment, which may be used to support macro substitution in some languages. In some embodiments, preprocessor 220 may modify various ones of tokens 212, which may result in a set of modified tokens, such as 222.

Compiler 200 may also include a syntactic analyzer 230 in some embodiments, which may be configured to parse the modified tokens 322 to identify syntactic structure of the input program. The syntactic analyzer may be configured to build a parse tree, such as parse tree 232, which may organize the tokens 222 into a tree structure according to the formal grammar of the programming language of the source code.

In the depicted embodiment, the compiler 200 may further include a semantic analyzer 240, which may be configured to add semantic information to parse tree 232 to create an annotated internal representation of the program, such as intermediate representation 244. In some embodiments, a code generator, such as code generator 260, may convert the intermediate representation 244 into an executable program, such as 262. Executable program 262 may be encoded in binary and/or bytecode and may correspond to executable code 130 in FIG. 1.

In some embodiments, semantic analyzer 240 may also build and/or maintain a symbol table, such as symbol table 242, which maps various symbols in the source code to associated information, such as the location, scope, and/or type. The semantic analyzer 240 may also include a type checker, such as type checker 255, to perform type-checking functions, e.g., to determine whether a conversion operation between a particular source type and target type is acceptable. If the type checker determines that a conversion operation is unacceptable, a compile-time error may be generated, and at least in some embodiments the compilation may fail. In some instances, warnings may be generated for certain types of operations, instead of or in addition to compile-time errors. For example, in some implementations, if a conversion is attempted that may result in some loss of precision of a numeric value, a warning may be generated even though the operation may be permitted and the program compiled. In some embodiments the compiler 200 may support special flags (such as "-Xlint") to enable the generation of a larger set of warnings than would otherwise be generated. In various embodiments, different components of compiler 200 shown in FIG. 2 may be combined or further deconstructed into multiple components. The compiler may also implement various additional types of functions, such as optimization, line reconstruction, and the like, not shown explicitly in FIG. 2, in some embodiments.

Figures 3, 4:
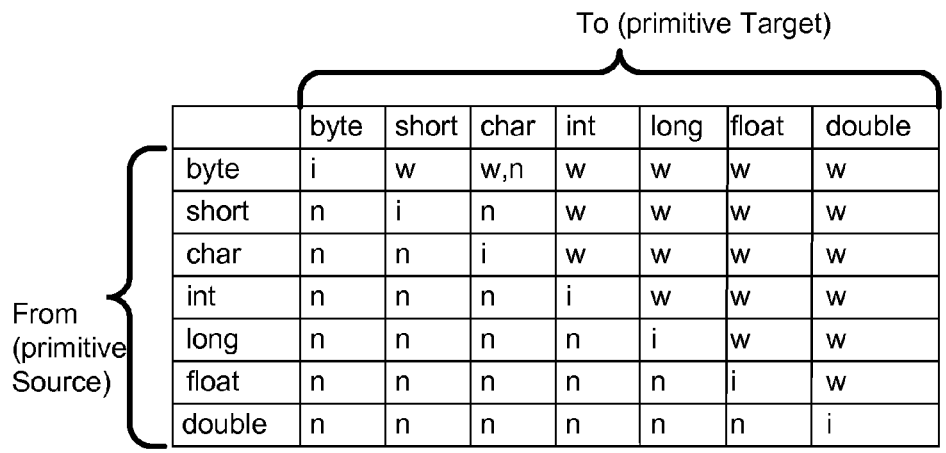
FIG. 3 illustrates sizes and ranges of primitive types that may be supported by an object-oriented language, according to various embodiments.
FIG. 4 illustrates examples of primitive-to-primitive conversion operations that may be supported by a compiler or an interpreter, according to some embodiments.

FIG. 3 illustrates sizes and ranges of some primitive types that may be supported by an object-oriented language, according to various embodiments. In general, a variable's data type determines the values it may contain, and the operations that may be performed on it. Primitive types may be predefined by the language specification, and may be named using reserved keywords (such as int or float). The value of a primitive type may be stored in a location of a fixed size on the stack, and may not share state with other primitive values. In contrast to primitive types, a data type for which, when an object of that data type is instantiated, a reference to a heap location storing the value of the instantiated object is created, is called a reference type. No such reference to a heap location may be required for primitive types in some embodiments, thereby potentially making manipulation of primitive values more efficient both in terms of computation (because no dereferencing of pointers may be required) and space, than manipulation of reference types. In general, a small number of primitive types, such as the eight primitive types shown in the depicted embodiment, may be supported by the language, while arbitrary numbers of reference types (e.g., classes, interfaces, or arrays, in the case of Java™) may be defined and created by users of the language.

In the embodiment depicted in FIG. 3, the supported primitive types include boolean, byte, short, int, long, float, double and char. Other primitive types may be supported in different embodiments, and/or some of the depicted primitive types may not be supported. A boolean primitive may use just one bit, and the possible range of its values may be limited to "true" and "false". Four primitives to store integral (i.e., non-fractional) numeric values may be supported: byte, short, int and long, taking up one two, four, and eight bytes, respectively. As indicated by the range shown in FIG. 3 for each integral primitive type, the larger primitive integral types may logically "include" the smaller ones. For example, every possible int value may be represented as a long value, every short value may be represented by an int or a long, and so on. Accordingly, as described below, it may be fairly straightforward for a compiler or an interpreter to convert or cast an int to a long in some embodiments, using what may be termed a "widening" conversion herein; such a conversion or cast may simply involve setting some of the bits of the larger primitive value to zero. Narrowing conversions, on the other hand, where a source primitive value (such as a long) is converted into a target primitive value that uses less space (such as an int), may involve some loss of precision or information, as also described below. Floats (four bytes) or doubles (eight bytes) may be used for numerical values that are not whole integers (i.e., contain some fractional components). Char primitives may use two byes to store character values defined in some character encoding set, such as UTF-16 (the 16-bit Unicode Transformation Format character encoding standard).

FIG. 4 illustrates examples of primitive-to-primitive conversion operations that may be supported in a language according to its specification, according to some embodiments. The source types are shown in the first column of FIG. 4, and the target types are shown in the first row. The rules governing exactly which kinds of primitive-to-primitive conversions are supported, and any limitations (such as possible loss of precision of a numeric value or even loss of information about the magnitude of a numeric value) of such conversions, may be defined in the programming language specification in some embodiments. The following symbols are used in FIG. 4 to indicate the kinds of conversion operations involved: "i" for identity conversions, "n" for narrowing primitive conversions, and "w" for widening primitive conversions. An identity conversion or cast, e.g., "int j=5; int i=(int) j", in which the source type and the target type are the same, may be permitted largely for the sake of completeness of a language specification in some embodiments.

A widening primitive conversion may be defined as a conversion in which in general, the target type has a wider range of supported values than the source type. For example, "short s= . . . ; int i=s;" is a widening primitive conversion from a 16-bit short value to a 32-bit int value.". In widening conversions between the integral primitive types (byte, short, int, or long), no information may be lost, i.e., the numeric value of the source may be preserved exactly. Some other widening primitive conversions, such as int to float, may result in loss of precision,—i.e., the result may lose some of the least significant bits of the value, and the result may be rounded according to some standard such as the IEEE 754 floating-point standard.

A narrowing primitive conversion (such as conversion of an int to a short), may be defined as a conversion in which in general, the source type has a wider range of supported values than the target, and less space is available for the target value than was available for the source value. As a result, a narrowing conversion may result in a loss of information about the magnitude of the numeric value of the source, loss of precision of the numeric value, a reduction in range of supported values, or some combination of these effects.

It is noted that some non-standard rules may apply in the case of a few primitive-to-primitive conversions (especially for char primitives), based on the language specification—e.g., the conversion from a byte to a char may involve a widening (of the byte to an int) followed by a narrowing (of the int to a char), as indicated by the notation "w, n" in FIG. 4, and conversions between short values and char values may be defined as narrowing conversions in both directions, despite the fact that both primitive types use two bytes. The kinds of primitive-to-primitive conversions illustrated in FIG. 4 may serve as building blocks for other kinds of conversions involving reference types, as described below in further detail.

In at least some embodiments, the instruction set of the bytecode (or machine code) generated from the source code may include instructions for direct conversions between some or all of the primitive types (e.g., an "i2b" instruction usable to convert an int to a byte, or a "d2i" instruction usable to convert a double to an int). Such direct conversion instructions may be used to generate the code for various types of conversion operations (not just primitive-to-primitive conversions) in some embodiments. In other embodiments, the instruction set may not include direct conversion instructions, and the compiler or interpreter may have to generate code for type conversion operations using more basic instructions supported by the instruction set, such as various arithmetic and logic instructions.

Some object-oriented languages may define a set of wrapper reference types to encapsulate primitive values as class objects, e.g., to allow the use of language features that are typically available only for objects (like various types of Collection functionality). For example, the Java™ language defines the following wrapper classes (i.e., wrapper reference types defined as classes in the java.lang package): Byte, Short, Character, Integer, Long, Float and Double for the primitive types byte, short, char, int, long, float and double respectively. (The wrapper class Boolean is also defined for primitive type boolean; however, conversions to or from these two types are not explicitly discussed below.) The following two statements illustrate the difference between a primitive data type and an object of a wrapper class:

1. int x=25;
2. Integer y=new Integer (33);

The statement in line 1 declares an int variable named x and initializes it with the value 25. The second statement instantiates an Integer object on the heap, initialized with the value 33. A reference or pointer to that heap object is assigned to the object variable y. Conversion of a primitive value to an object of the corresponding wrapper type may be referred to as "boxing" the primitive value, and the extraction of the primitive value from an object of the corresponding wrapper class may be referred to as "unboxing" the wrapper. One or more unboxing class methods may be supported for a given wrapper class in some embodiments, e.g., the intValue( ) method for an Integer may return an int representing the numerical value of an Integer object. For numeric wrapper types (i.e., wrapper types other than Boolean or Character), unboxing class methods may be available to obtain primitive values for all the other numeric primitive types in some embodiments—e.g., the Integer class may support byteValue( ) shortValue( ) long Valued, floatValue( ) and doubleValue( ) methods in addition to intValue( ). These methods may be used for reference-to-primitive conversions in some embodiments, as described below with reference to FIG. 5, and may be referred to collectively as "value extraction methods" or as the "*Value( )" methods herein.

To help simplify programming, and reduce the potential program clutter induced by explicit boxing and unboxing operations, in some embodiments the object-oriented language may support automating the process of boxing and unboxing. Such "autoboxing/auto-unboxing" support may, for example, result in the following being considered legal statements: "int y=3; Integer z=y;" or "Integer k=new Integer (56); int l=k;". Some of the kinds of reference-to-primitive or primitive-to-reference conversions described below may use boxing and/or unboxing operations in various embodiments. As noted above, data type conversions may be supported in several different contexts in various programming languages. Some kinds of conversions may be considered "safer" than others, e.g., with respect to possible loss of information, and may be supported in more different contexts than other conversions that are deemed less "safe". For example, because a widening primitive-to-primitive conversion like byte-to-int does not (as long as it is implemented correctly) involve possible information loss, it may be permitted in several contexts, and may not be limited to casting operations. Similarly, the techniques described below for implementing widening primitive-to-reference conversions (such as byte-to-Integer conversions) may allow such conversions to be supported in several different contexts in some embodiments. In contrast, a narrowing primitive-to-primitive conversion, such as int-to-byte, may be considered unsafe due to the possibility of information loss, and as a result may be limited to contexts such as explicit casting operations where the programmer has to acknowledge the danger of possible loss if information. Similar logic may also restrict the contexts in which narrowing primitive-to-reference conversions (such as Integer-to-byte conversions), described below, are allowed in some embodiments.

FIG. 5 illustrates examples of reference-to-primitive conversion operations that may be supported, according to some embodiments. Eight source reference types are shown in the first column of FIG. 5, including the seven wrapper reference types discussed above and an Object type which is every reference type's ultimate supertype. Seven target primitive types of the conversions are shown in the first row. For at least some languages in some embodiments, the language specification may evolve over time—e.g., a later version of a language specification may indicate support for more advanced functionality than an earlier version did. Thus, for example, some or all of the types of conversions illustrated in FIG. 5 (and in FIG. 6) may not be explicitly supported in a given version of the language specification, but may be added to later versions of the specification. Thus, the expressiveness of conversion may be improved over time, by filling out more and more of the table illustrated in FIG. 5. Furthermore, in at least some cases, even though some of the conversions may be officially supported (at least in the sense of not causing errors based on analysis prior to runtime) in a given version of the language, the underlying implementation of that support may be incomplete. For example, while conversion operations from arbitrary Object expressions to all the seven primitive types may compile successfully in a given version of a language, it may be the case that for that language version, only those Object-to-primitive conversions in which the source Object expression happened to dynamically be an instance of a wrapper type for the targeted primitive type of the conversion may succeed at runtime. All other Object-to-primitive conversions may fail at runtime for that version of the language, with an exception such as "ClassCastException" being thrown. A later version of the compiler, interpreter and/or language specification may improve the quality of the conversions by increasing the power of existing legal (prior to runtime, e.g., at compile-time) conversions, e.g., by supporting more kinds of Object-to-primitive conversions as described below.

The following symbols are used in FIG. 5 to indicate the different types of conversions: "u" for an unboxing conversion, "NN" for narrowing reference-to-primitive conversion, "WW" for a widening reference-to-primitive conversion, "w" for a widening primitive-to-primitive conversion, and "r" for a narrowing reference-reference conversion. With respect to reference-to-primitive conversions, a conversion may be termed "narrowing" if in general, the unboxed primitive type corresponding to the source has a wider range of supported values than the target, and less space is used for the target than would be used for the unboxed primitive value of the source, such as in the case of a Long-to-int conversion. Similarly, a reference-to-primitive conversion may be termed widening if in general the unboxed primitive type corresponding to the source has a narrower range of supported values than the target, and more space is used for the target than would be used for the unboxed primitive value of the source, such as in the case of an Integer-to-long conversion. The Character-to-short conversion and the Short-to-character conversions may be deemed "narrowing" even though the values of both of the corresponding primitives may be stored using two bytes. A narrowing reference-to-reference conversion, may, for example, represent a conversion from a supertype to a subtype. In the illustrated embodiment, the NN conversions may preserve the numeric value of the reference source object when possible.

In order to implement the NN conversions shown in FIG. 5 efficiently, in some embodiments the compiler or interpreter may take advantage of support provided in the language to determine whether a particular expression with static type Object represents a runtime object of one of the wrapper types discussed above, and if so, whether it represents a Character wrapper type or a numeric wrapper type. Consider the following source code as a generic example of a reference-to-primitive conversion that may require an NN conversion:

1. Object o=42;
2. P b=(P) o; //P is one of byte/short/char/int/long/float/double In at least some such embodiments, the bytecode or machine code generated for the above reference-to-primitive conversion (or for similar conversions in other contexts than casts, such as method invocation or assignment) may be logically equivalent to the following high-level code:

---

1. // Target primitive type P is one of byte/short/char/int/long/float/double
2. // declare a variable target of type P
3. // in line 5, "P" would be replaced by the appropriate primitive type, e.g.,
4. //      line 5 might be "int target";
5. P target;
6. // check, using the isPrimitive( ) method of the java.lang.Class class,
7. //      whether the source object belongs to one of the wrapper classes
8. if (o.getClass( ).isPrimitive( )) {
9.     // now check whether source object is numeric
10.    if (o instanceOf java.lang.Number) {
11.        // obtain target value by (a) explicit cast to Number, and then
12.        //     (b) using the appropriate *Value( ) unboxing method
13.        target = ((Number)o).PValue( );
14. } else if (o instanceOf java.lang.Character) {
15.        // obtain target value by (a) explicit cast to Character, -continued

```
16.       //     (b) extracting character value using charValue( ) method
           and then
17.       //     (c) using primitive-to-primitive conversion to target type
18.       target = (P)((Character)o).charValue( );
19.    } else // o is a Boolean
20.       throw new ClassCastException;
21.    }
22. } else { // isPrimitive( ) returned false, so throw runtime exception
23.    throw new ClassCastException;
24. }
```

In the above example, the compiler or interpreter may first determine whether the source type is a reference type (i.e., that the source type is not a primitive type), and then generate code to determine more details about exactly what types of values can be extracted from the source. As indicated in the high-level code snippet above, the compiler or interpreter may generate code to determine whether a primitive value of the target data type can be obtained using one of the other supported conversion operators—such as, in the case of the numeric wrapper source types, the intValue( ), shortValue( ) and other *Value( ) or value extraction methods available, and (in the case of a Character reference type) the char-to-primitive conversions shown in FIG. 4. Common bytecode implementing the logic shown in the above code may be shared for a plurality of the NN conversions shown in FIG. 5 in some embodiments, instead of using different logic specific to each of the wrapper types. As shown in lines 20 and 23, the generated code may still throw an exception if it is determined at run time that a meaningful primitive value cannot be extracted from the source expression of the conversion operation. It is noted that although the source code snippet shown above uses the "Number" superclass of the numeric wrapper classes, the use of such a superclass is not a requirement; e.g., in some embodiments, instead of generating code for the Number-based if clause in lines 10 and 13, code for separate if clauses for each of the numeric wrapper classes could be generated, such as "if o.instanceOf(javalang.Integer) {target=(Integer) o.PValue( )} else if o.instanceOf(java.lang.Long) {target= (Long)o.PValue( )} and so on. It is also noted that although the value extraction methods in the example are shown as being offered by the wrapper classes (in lines 13 and 18), such value extraction methods do not necessarily have to be offered by the wrapper classes themselves; e.g., value extraction methods provided by a utility class (and not by a wrapper class) may be used in some embodiments.

The "u, w" conversions, shown above the diagonal in FIG. 5, may be easier to implement than the NN conversions, in that once a primitive value is obtained by unboxing, it may straightforward to then use the "w" conversions of FIG. 4 to obtain the desired target primitive value. The "WW,NN" Byte-to-char conversion may be analogous to the special-case "w, n" byte-to-char conversion of FIG. 4.

The bottom row of FIG. 5 represents four possibilities for conversions from expressions of static (e.g., compile-time, in environments where a compiler is being used) type Object to a primitive target type for some embodiments. (It is noted that especially in cases where source code is in a dynamically typed language such as Ruby or Python, the static or compile-time type of a substantial number of the objects being dealt with may default to general object types; that is, the type of the objects may only become clear at run-time.) If the run-time type of the source is numeric or Character, and exactly matches the primitive target type, e.g., in a case similar to "(byte) new Byte(42)", a narrowing reference conversion may be followed by unboxing. If the run-time type of the source object is numeric or Character, and does not match the primitive target types exactly, such as in the examples "(byte) new Integer(42)", the NN conversion may be implemented using the logic described above (in the example code that uses isPrimitive( ) and instanceOfjava.lang.Number). In the special case of a conversion from Byte to char, a WW,NN conversion involving both widening and narrowing may be used. Finally, if the run-time type of the source object is not numeric or Character, a ClassCastException or some other run-time error may result. It is noted that Boolean reference-to-primitive conversions may also be supported in some embodiments, although Boolean is not listed among the wrapper types of FIG. 5.

FIG. 6 illustrates examples of primitive-to-reference conversion operations that may be supported, according to some embodiments. The symbols used in FIG. 6 for the various conversion operations include "b" for boxing operations, "nn" for narrowing primitive-to-reference conversions (which may represent the logical dual of the NN conversions discussed above), "ww" for widening primitive-to-reference conversions (which may represent the logical dual of the "u,w" conversions shown in FIG. 5), and R (representing widening reference conversions, e.g., from a subtype to a supertype). As in the case of the reference-to-primitive conversions described above, some of the types of primitive-to-reference conversions illustrated in FIG. 6 may not be explicitly supported in a given version of the language specification, but may be added to later versions of the specification over time.

Consider, as an example, the following primitive to reference cast operation (the "nn" case, since this is a conversion from an int to a Short):
1. int i=32;
2. Short s=(Short) i;

To implement the requested conversion from the int primitive to the Short reference type, a compiler or an interpreter could in some embodiments generate code to do the following: (a) converting the int to an Integer (b) extracting the short primitive value of the Integer, e.g. using the shortValue( ) class method available for Integers and then (c) boxing the short value to a Short object. E.g., code to perform the logical equivalent of the following may be generated:

```
1. // box the int to an Integer
2. Integer tempInteger = Integer.valueOf(i);
3. // extract a short
4. short tempShort = tempInteger.shortValue( );
5. // box to Short
6. Short s = Short.shortValue(tempShort);
```

It is noted that the three conversion operations illustrated separately above may also be accomplished by a single line of high-level code, such as "Short s=Short.shortValue(Integer.valueOf(i).shortValue( );". A similar three-step approach (boxing to obtain a wrapper corresponding to the source primitive operand, followed by value extraction of the primitive type that can be wrapped by the target reference type, followed by boxing to the target reference type) may be used for "ww" widening conversions in some embodiments.

Given support for the different primitive-to-reference conversions illustrated in FIG. 5, and support for the different reference-to-primitive conversions illustrated in FIG. 6, numerous reference-to-reference conversions may be enabled in some embodiments. For example, a cast from a Short to an Integer may be accomplished using any of the following approaches: (a) Short-to-int conversion as in FIG.

6, followed by int-to-Integer boxing; (b) Short-to-short unboxing, followed by short-to-Integer conversion as in FIG. 6; (c) Short-to-short unboxing, followed by short-to-int conversion as in FIG. 4, followed by int-to-Integer boxing; or (d) integer value extraction using the Short.intValue( ) method, followed by int-to-Integer boxing. The specific choice as to which combination of operators, among these types of choices, is used by the compiler or interpreter for reference-to-reference conversions may differ from one implementation to another. The set of composite conversions between various reference types may be represented as commutative diagrams in some embodiments, in which the vertices represent the types, and the edges represent the conversions. Some of the conversion paths in such a diagram may have alternative implementations of the same functionality, from which one may be selected in a given embodiment or implementation; the conversion function in a mathematical sense may be separated from its implementation. It is also noted that in various embodiments, the different conversion tables shown in FIGS. 4, 5 and 6 may not have some of the illustrated structural properties, such as symmetry around the diagonal of a given table or a 1:1 correspondence between the reference-to-primitive conversion table of FIG. 5 and the primitive-to-reference conversion table or FIG. 6. That is, in some embodiments, only a subset of the conversions illustrated may be supported.

Figure 7:
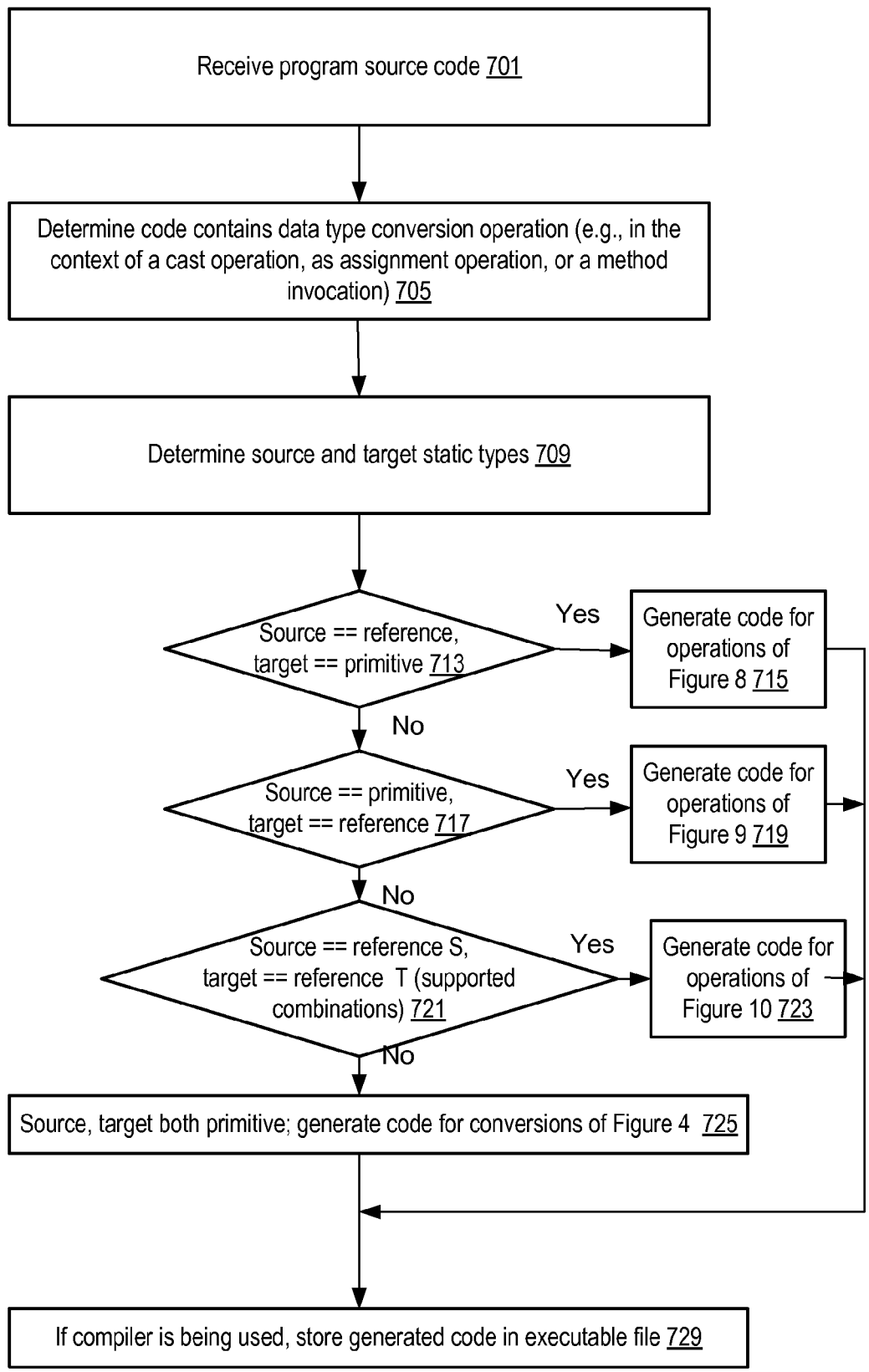
FIG. 7 illustrates aspects of the operation of a tool configured to support primitive-to-reference, reference-to-primitive, and reference-to-reference conversion operations, according to some embodiments.

FIG. 7 illustrates aspects of the operation of a tool such as a compiler or an interpreter configured to support primitive-to-reference, reference-to-primitive, and reference-to-reference conversion operations of the types discussed above, according to some embodiments. As shown in element 701, the tool may receive source code of the program to be compiled, e.g., in the form of .java files. The compiler may parse and analyze the source code and determine whether any data type conversion operations are included (element 705). For each conversion operation encountered in the source code, the tool may determine which category or kind of conversion is involved, with respect to (source, target) combinations of (primitive, reference) static data types (i.e., data types that can be determined prior to execution). The four possibilities are (source=primitive, target=primitive), (source=primitive, target=reference), (source=reference, target=primitive) and (source=reference, target=reference). In some embodiments, only certain kinds of reference-to-reference conversions may be supported: e.g., where the source is a reference type with a corresponding primitive type (or Object), and the target is a different reference type with a corresponding primitive type. Using the notation B for Boolean, S for Short, C for Character, I for Integer, L for Long, F for Float, and D for Double, the kinds of reference-to-reference conversions supported in such embodiments may include (a) Object→B/S/C/I/L/F/D and (b) B/S/C/I/L/F/D→B/S/C/I/L/F/D where the target is different than the source. Conversions from (a) B/S/C/I/L/F/D→B/S/C/I/L/F/D, where the target is the same type as the source and (b) B/S/C/I/L/F/D→Object, may both be excluded in such embodiments, as such conversions require no work.

In the (source=reference, target=primitive) case, as detected in element 713, the tool may generate code for the conversions illustrated in FIG. 5. Executable code (e.g., in the bytecode for the language in which the program is written, and/or in machine code) may be generated for the high-level operations illustrated in FIG. 8 in some embodiments, as shown in element 715 of FIG. 7. In the (source=primitive, target=reference) case, as detected in element 717, code may be generated for the conversions illustrated in FIG. 6, corresponding to the high-level operations illustrated in FIG. 9 in the depicted embodiment, as indicated in element 719.

Figure 10:
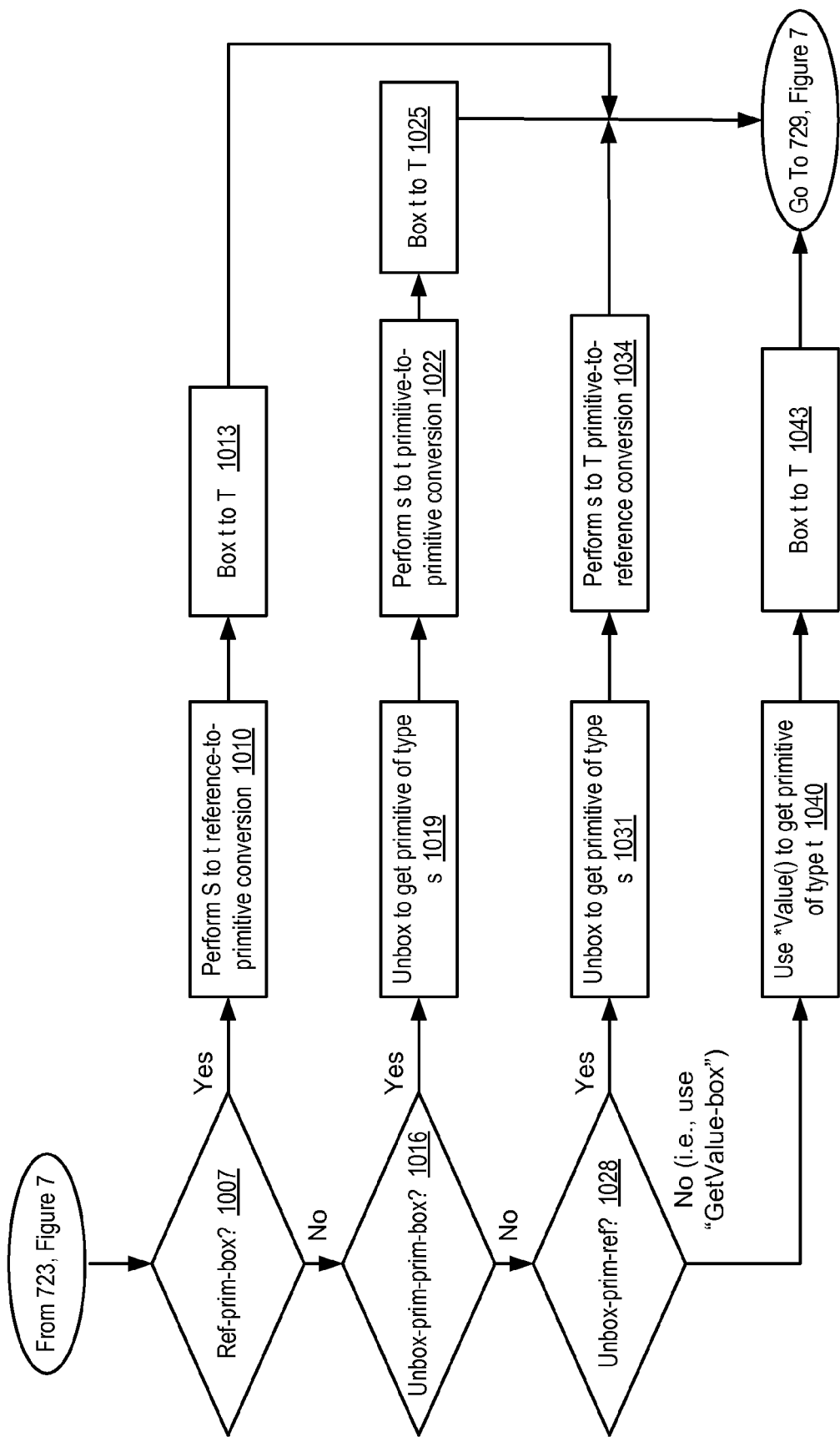
FIG. 10 illustrates an example of operations logically equivalent to code that may be generated to implement a reference-to-reference conversion operation, according to some embodiments.

If the conversion is a reference-to-reference conversion between source type S and target type T of one of the supported kinds indicated above, as determined in element 721, code may be generated in a number of different ways involving different combinations of unboxing, boxing, value extractions using the *Value( ) value extraction methods, and so on, as discussed above. Examples of the high-level operations for these choices, for which corresponding executable code may be generated, are shown in FIG. 10, as indicated in element 723 of FIG. 7. If the conversion is primitive-to-primitive, code may be generated corresponding to the different operations illustrated in FIG. 4 (element 725). In embodiments where a compiler is being used, the generated code may be stored in an executable file as shown in element 729, and may be executed at an execution platform as described above with reference to FIG. 1.

Figure 8:
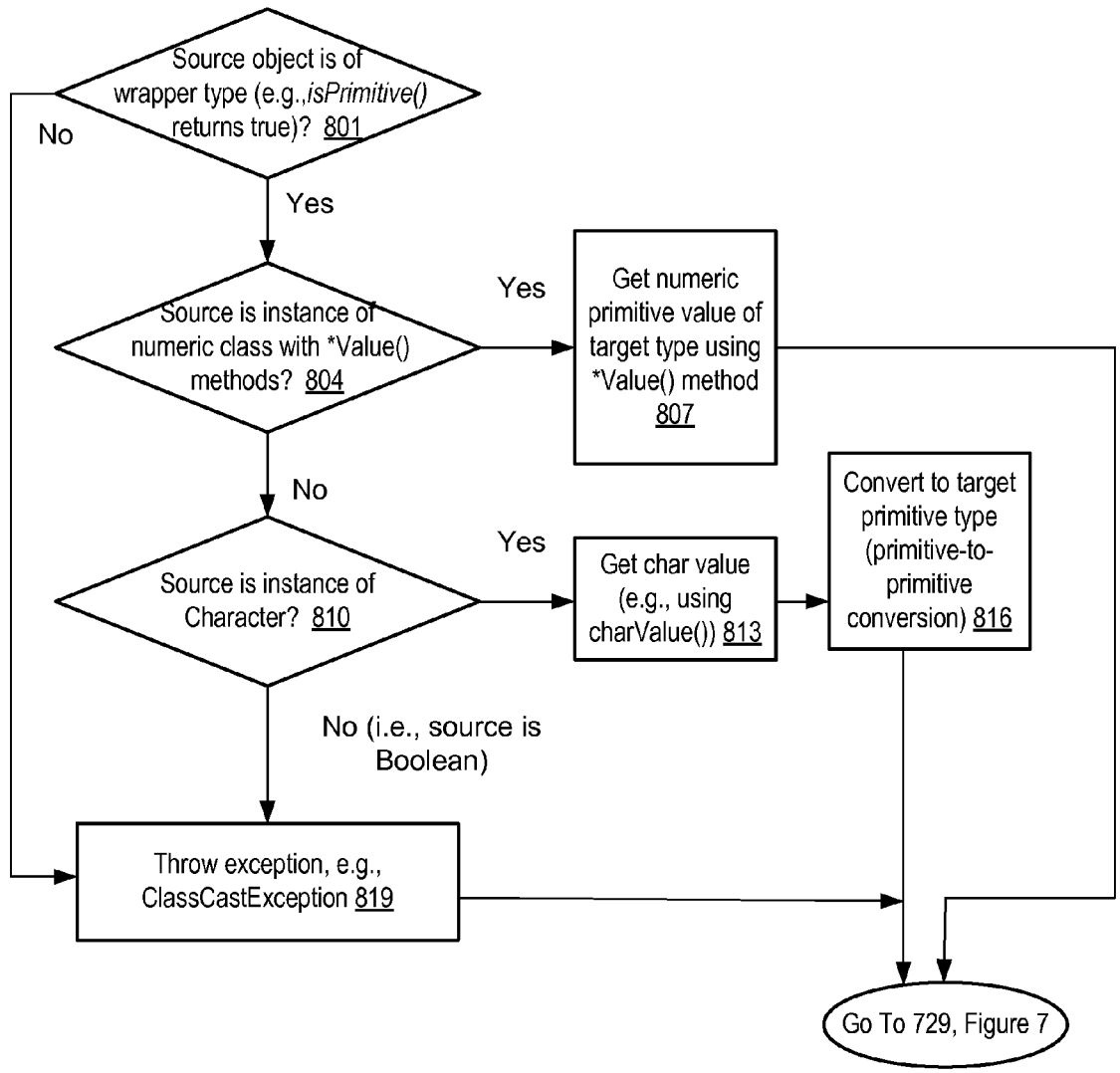
FIG. 8 illustrates an example of operations logically equivalent to code that may be generated to implement a reference-to-primitive conversion operation, according to some embodiments.

FIG. 8 illustrates an example of operations logically equivalent to code that may be generated to implement a reference-to-primitive conversion operation, according to some embodiments. As shown in element 801, the generated code may first determine, e.g., using the java.lang.Class isPrimitive( ) method discussed above or an equivalent, whether the source is an object of one of the wrapper types. If isPrimitive( ) or its equivalent returns a negative result, this may indicate that a value of the target primitive type cannot be obtained from the source, so code may be generated to throw a run-time error or exception (element 819), such as a ClassCastException.

If code generated for isPrimitive( ) or its equivalent returns a "true" result, there may be three further possibilities regarding the type of the source. If the source is an instance of one of the numeric wrapper types (such as Byte, Short, Integer, Long, Float or Double), as determined in code generated for element 804), the target primitive value may simply be extracted using code for the appropriate value extraction method (e.g., intValue(for int, shortValue for short, and so on) (element 807). If the source is an instance of the Character wrapper type (as detected in code generated corresponding to element 810), code may be generated to first extract the char value of the source (e.g., using the equivalent of a charValue( ) method), as shown in element 813 of FIG. 8. The char value may then be converted to the target primitive type using code generated for the appropriate primitive-to-primitive conversion (e.g., one of the conversions shown in the char row of FIG. 4), as indicated in element 816. The third and final scenario if isPrimitive( ) or its equivalent returns true is that the source is of type Boolean, in which case a run-time error or exception may be generated (element 819, reached from "No" branch out of element 810). It is noted that, depending on the tool being used, the generated code for the operations shown may either be stored for later execution (e.g., if a compiler is being used) or may be executed immediately (e.g., if an interpreter or just-in-time compiler is being used).

Figure 9:
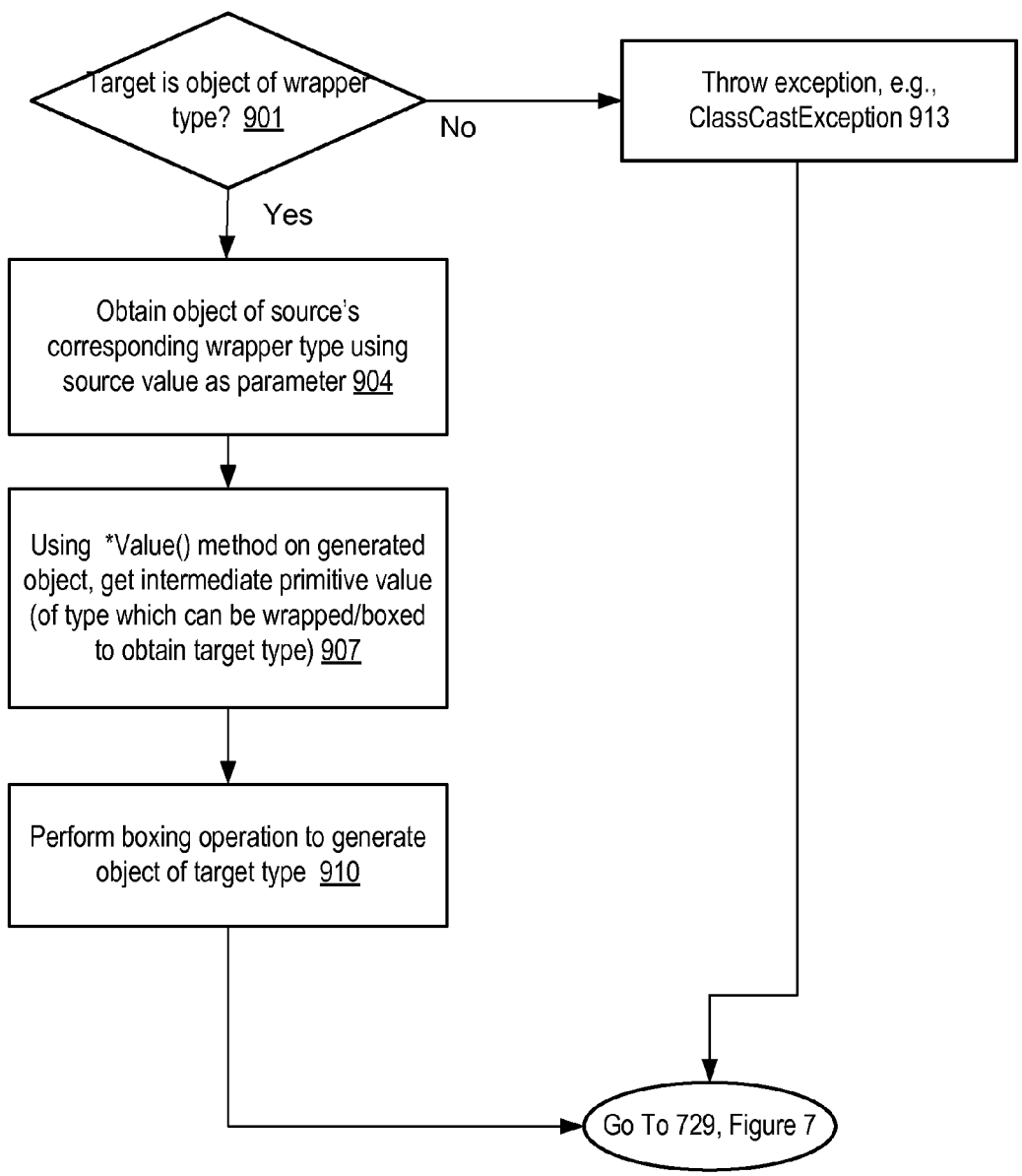
FIG. 9 illustrates an example of operations logically equivalent to code that may be generated to implement a primitive-to-reference conversion operation, according to some embodiments.

FIG. 9 illustrates an example of operations logically equivalent to code that may be generated by a compiler or an interpreter to implement a primitive-to-reference conversion operation, according to some embodiments. As shown in element 901, in the depicted embodiment, the compiler or interpreter may determine whether the target reference type is an object of one of the wrapper types. If the target is not a wrapper type, code may be generated to indicate a run-time error or exception, such as a ClassCastException (element 913).

If the target type is one of the wrapper types, code may be generated to obtain a wrapped object from the primitive source value—e.g., an Integer if the source is an int, a Short if the source is a short, and so on (element 904). If the source is "int i", for example, the wrapped object may be obtained using the code for the equivalent of "Integer tempinteger=Integer.valueOf(i);". Then, using code for the appropriate *Value( ) value extraction method for the wrapper object so obtained, an intermediate primitive value of a primitive type that can be wrapped to obtain an object of the target type may be obtained (element 907). For example, if the target reference type is Short, code may be generated in the above example for the following: "short tempShort=tempInteger.shortValue( )". Finally code may be generated to box the primitive obtained from the *Value( ) method, to the target type of the conversion, e.g., code for "Short s=Short.shortValue(tempShort);" may be generated in the example scenario of converting an int to a Short.

FIG. 10 illustrates an example of operations logically equivalent to code that may be generated to implement some kinds of reference-to-reference conversion operation, according to some embodiments. Only certain kinds of reference-to-reference conversions may be supported in the depicted embodiment, e.g., where the source is a reference type with a corresponding primitive type (or Object), and the target is a different reference type with a corresponding primitive type. Using the notation introduced earlier, the kinds of reference-to-reference conversions supported in such embodiments may include (a) Object→B/S/C/I/L/F/D and (b) B/S/C/I/L/F/D→B/S/C/I/L/F/D where the target is different than the source. Conversions from (a) B/S/C/I/L/F/D→B/S/C/I/L/F/D, where the target is the same type as the source and (b) B/S/C/I/L/F/D→Object, may both be excluded, as such conversions require no work As noted above, given the ability to convert primitives to primitives (FIG. 4), references to primitives (FIGS. 5 and 8), and primitives to references (FIGS. 6 and 9), several options may be available to combine these conversion techniques in order to implement a supported reference-to-reference conversion. Four such combinations are shown for the embodiment depicted in FIG. 10. These four approaches are labeled, respectively, "Ref-prim-box", "Unbox-prim-prim-box", "Unbox-prim-ref", and "GetValue-box" in FIG. 10. In some embodiments, additional approaches beyond the four illustrated in FIG. 10 may be implemented for reference-to-reference conversions.

In the embodiment depicted in FIG. 10, a tool such as a compiler or interpreter may choose one of the four approaches "Ref-prim-box", "Unbox-prim-prim-box", "Unbox-prim-ref", and "GetValue-box", and generate code according to the chosen approach. It is noted that in some embodiments, the tool may be configured to support just one of the approaches, i.e., the tool may not need to explicitly choose among more than one approach; and that in other embodiments, a subset of the four approaches may be implemented.

If the Ref-prim-box approach is taken (element 1007), code may be generated to first convert the source of type S to a primitive value of type t, e.g., using the reference-to-primitive conversion techniques described earlier (element 1010), and then to box the primitive value t to the target reference type T (element 1013). If the Unbox-prim-prim-box approach is taken (element 1016), code may be generated to first unbox the source of type S to a primitive value of type s (element 1019), followed by a primitive-to-primitive conversion to type t (element 1022), followed by a box to type T (element 1025).

If the Unbox-prim-ref approach is taken (element 1028), code may be generated to first unbox the source of type S to a primitive value of type s (element 1031), followed by a primitive-to-reference conversion to type T (element 1034). If the GetValue-box approach is taken, the code may be generated to first use the equivalent of a value extraction method to obtain a primitive value of type t (element 1040), followed by a boxing of the primitive value to type T (element 1043).

At least in some embodiments, more (or different) approaches may be feasible for reference-to-reference conversions than those shown in FIG. 10, using various combinations of the primitive-to-primitive, primitive-to-reference, and reference-to-primitive conversion techniques described earlier. In some embodiments, the instruction set for the bytecode (or machine code) to which the source code is compiled may include instructions for direct conversions of some or all of the primitive types (e.g., an "i2b" instruction usable to convert an int to a byte, or a "d2i" instruction usable to convert a double to an int), which may be used by a compiler or an interpreter to generate the code for various types of conversion operations included in the source code. In at least one embodiment, new bytecode instructions may be added to the bytecode instruction set specifically for the purpose of facilitating the different types of conversions described herein.

Figure 11:
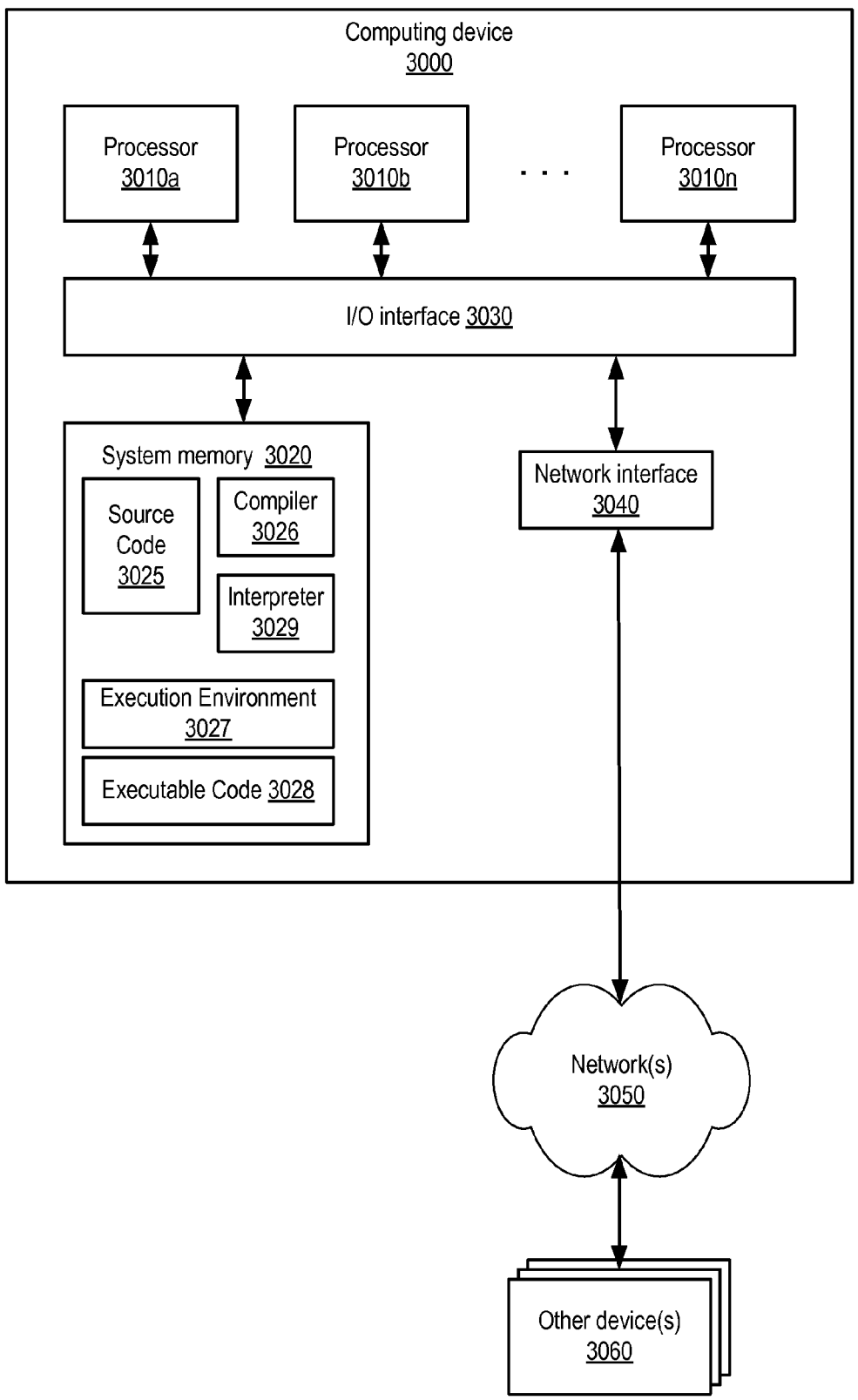
FIG. 11 is a block diagram illustrating a computing device configured to implement a tool such as a compiler or an interpreter with support for various types of conversion operations, according to at least some embodiments.

FIG. 11 is a block diagram illustrating a computing device 3000 configured to implement a compiler with support for the different types of conversion operations described above, according to at least some embodiments. The computer device 3000 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device. In the illustrated embodiment, computing device 3000 includes one or more cores or processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several cores or processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the SPARC, x86, PowerPC, or MIPS ISAs, or any other suitable ISA. In multiprocessor systems, each of processors 3010 may commonly, but not necessarily, implement the same ISA.

System memory 3020 may be configured to store program instructions implementing a compiler 3026, an interpreter 3029, source code 3025 of various programs to be compiled, executable code 3028 generated by the compiler or other compilers, and an execution environment 3027 similar to runtime environment 140 of FIG. 1. System memory may also include program instructions and/or data for various other applications. Program instructions may be encoded in platform native binary, any interpreted language such as Java™ bytecode, or in any other language such as C/C++, Java™, etc. or in any combination thereof. In various embodiments, system memory 3020 may be implemented using any suitable memory technology, such as static random access memory (SRAM), synchronous dynamic RAM (SDRAM), nonvolatile/Flash-type memory, or any other type of memory.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A non-transitory computer-readable storage medium storing program instructions executable by a computer to implement a tool configured to:
   receive source code for a computer program, written in a programming language that supports primitive types and reference types;
   determine, for an operation in the source code for which type conversion is permitted on at least one operand, a source type of the operand and a target type to which the operand is to be converted;
   in response to determining that the source type is a reference type corresponding to a source primitive type and the target type is a primitive type different than the source primitive type, generate a set of instructions to:
      determine whether, at run time, in accordance with a class definition of the reference type, a value of the target primitive type can be obtained via one or more method invocations on the operand;
      in response to determining that a value of the target primitive type can be obtained, obtain the value and assign the value to a result of the operation; and
      in response to determining that a value of the target primitive type cannot be obtained, generate an error indication.

2. The storage medium as recited in claim 1, wherein the tool comprises at least one of: a compiler or an interpreter.

3. The storage medium as recited in claim 1, wherein, to determine whether a value of the target primitive type can be obtained, the tool is configured to generate instructions to:
   determine whether the run-time class of the operand is a wrapper class designed to encapsulate a primitive value.

4. The storage medium as recited in claim 3, wherein, to determine whether a value of the target primitive type can be obtained, the tool is configured to generate instructions to:
   determine, from the kind of wrapper class of which the operand is an instance, a method able to extract the primitive value encapsulated by the operand.

5. The storage medium as recited in claim 4, wherein, to obtain the value assigned to the result, the tool is further operable to generate instructions to:
   perform at least one narrowing conversion operation by invoking, on the operand object, the method able to extract the primitive value, wherein a result value of the narrowing conversion requires fewer bits of memory storage than the operand requires.

6. The storage medium as recited in claim 1, wherein, to obtain the value assigned to the result, the tool is further operable to generate instructions to:

perform at least one widening conversion operation, wherein a result value of the widening conversion requires more bits of memory storage than the operand requires.

7. The storage medium as recited in claim 1, wherein the set of instructions generated comprises a bytecode instruction for type conversion.

8. The storage medium as recited in claim 1, wherein the tool is configured to:
in response to determining that the source type is a primitive type and the target type is a reference type, generate a second set of instructions to:
obtain at run time, using the operand as a parameter of a boxing operation, an object of a wrapper class corresponding to the primitive type;
perform a numeric conversion operation supported by the wrapper class to obtain an intermediate primitive value of a different primitive type encapsulated by the target type; and
perform another boxing operation to obtain an object of the target type from the intermediate primitive value.

9. The storage medium as recited in claim 1, wherein the tool is configured to:
in response to determining that the source type is one of (a) a first reference type with a corresponding primitive type or (b) a supertype of all other reference types defined in the programming language, and the target type is a different reference type with a corresponding primitive type, generate a second set of instructions to implement a sequence of operations to obtain an object of the target type from the operand, wherein the sequence comprises one or more of: a reference-to-primitive conversion, an unboxing operation, a primitive-to-reference conversion, a boxing operation, or a numeric value extraction operation.

10. A method, comprising:
receiving, as input for a tool associated with a programming language that supports primitive types and reference types, source code for a computer program;
determining by the tool, for an operation in the source code for which type conversion is permitted on at least one operand, a source type of the operand and a target type to which the operand is to be converted;
in response to determining that the source type is a reference type corresponding to a source primitive type and the target type is a primitive type different than the source primitive type, generating by the tool a set of instructions to:
determine whether, at run time, in accordance with a class definition of the reference type, a value of the target primitive type can be obtained via one or more method invocations on the operand;
in response to determining that a value of the target primitive type can be obtained, obtain the value and assign the value to a result of the operation; and
in response to determining that a value of the target primitive type cannot be obtained, generate an error indication.

11. The method as recited in claim 10, wherein said generating a set of instructions comprises:
generating, to determine whether a value of the target primitive type can be obtained, instructions to determine whether the run-time class of the operand is a wrapper class designed to encapsulate a primitive value.

12. The method as recited in claim 11, wherein said generating a set of instructions comprises:
generating instructions to determine, from the kind of wrapper class of which the operand is an instance, a method able to extract the primitive value encapsulated by the operand.

13. The method as recited in claim 10, further comprising:
in response to determining that the source type is a primitive type and the target type is a reference type, generating a second set of instructions to:
obtain at run time, using the operand as a parameter, an object of a wrapper class corresponding to the primitive type;
perform a numeric conversion operation supported by the wrapper class to obtain an intermediate primitive value of a different primitive type encapsulated by the target type; and
obtain an object of the target type from the intermediate primitive value.

14. The method as recited in claim 10, further comprising:
in response to determining that the source type is one of (a) a first reference type with a corresponding primitive type or (b) a supertype of all other reference types defined in the programming language, and the target type is a different reference type with a corresponding primitive type, generating, a set of instructions to implement a sequence of operations to obtain an object of the target type from the operand, wherein the sequence comprises one or more of: a reference-to-primitive conversion, an unboxing operation, a primitive-to-reference conversion, a boxing operation, or a numeric value extraction operation.

15. The method as recited in claim 10, wherein the set of instructions comprises virtual machine bytecode instructions.

16. A system, comprising:
one or more processors;
a memory coupled to the one or more processors, wherein the memory stores program instructions executable by the processors to implement a tool for a programming language supporting reference types and primitive types, wherein the tool is configured to:
receive source code for a computer program;
determine, for an operation in the source code for which type conversion is permitted on at least one operand, a source type of the operand and a target type to which the operand is to be converted;
in response to determining that the source type is a reference type corresponding to a source primitive type and the target type is a primitive type different than the source primitive type, generate a set of instructions to:
determine whether, at run time, a value of the target primitive type can be obtained via one or more method invocations on the operand;
in response to determining that a value of the target primitive type can be obtained, obtain the value and assign the value to a result of the operation; and
in response to determining that a value of the target primitive type cannot be obtained, generate an error indication.

17. The system as recited in claim 16, wherein, to determine whether a value of the target primitive type can be obtained, the tool is configured to generate instructions to:
determine whether the run-time class of the operand is a wrapper class designed to encapsulate a primitive value.

18. The system as recited in claim 17, wherein, to determine whether a value of the target primitive type can be obtained, the tool is configured to generate instructions to:

determine, from the kind of wrapper class of which the operand is an instance, a method able to extract the primitive value encapsulated by the operand.

19. The system as recited in claim 16, wherein the tool is configured to:

in response to determining that the source type is a primitive type and the target type is a reference type, generate a second set of instructions to:

obtain at run time, using a boxing operation, an object of a wrapper class corresponding to the primitive type;

perform a numeric conversion operation supported by the wrapper class to obtain an intermediate primitive value of a different primitive type encapsulated by the target type; and perform another boxing operation to obtain an object of the target type from the intermediate primitive value.

20. The system as recited in claim 16, wherein the tool is configured to:

in response to determining that the source type is one of (a) a first reference type with a corresponding primitive type or (b) a supertype of all other reference types defined in the programming language, and the target type is a different reference type with a corresponding primitive type, generate a second set of instructions to implement a sequence of operations to obtain an object of the target type from the operand, wherein the sequence comprises one or more of: a reference-to-primitive conversion, an unboxing operation, a primitive-to-reference conversion, a boxing operation, or a numeric value extraction operation.

* * * * *

UNITED STATES PATENT AND TRADEMARK OFFICE
CERTIFICATE OF CORRECTION

PATENT NO. : 8,863,079 B2  Page 1 of 1
APPLICATION NO. : 13/563587
DATED : October 14, 2014
INVENTOR(S) : Darcy et al.

It is certified that error appears in the above-identified patent and that said Letters Patent is hereby corrected as shown below:

On the Title page, Item (54) and in the Specification, column 1, under title of the invention, delete "REFERENCE AND PRIMITIVE" and insert -- REFERENCE AND PRIMITIVE TYPES --, therefor.

On the Title page, Item (56) under Other Publications, line 1, delete "Introducting" and insert -- Introduction --, therefor.

In the Specification

In column 8, line 66, delete "long Valued," and insert -- longValue(), --, therefor.

In column 18, line 10, delete "thereof" and insert -- thereof. --, therefor.

Signed and Sealed this
Twenty-third Day of June, 2015

Michelle K. Lee
*Director of the United States Patent and Trademark Office*